2 Sheets—Sheet 1.

L. W. HASSELMAN.

STRAW STACKER.

No. 10,347.

Reissued July 3, 1883.

WITNESSES.

Jacob W. Loeper

Chas. S. Spritz.

INVENTOR.

Lewis W. Hasselman

By C. F. Jacobs

Atty.

N. PETERS, Photo-Lithographer, Washington, D. C.

L. W. HASSELMAN.

STRAW STACKER.

No. 10,347. Reissued July 3, 1883.

WITNESSES.

Jacob W. Loeper

Chas. Spritz.

INVENTOR.

Lewis W. Hasselman

By C. F. Jacobs

Atty.

N. PETERS. Photo-Lithographer. Washington, D. C.

UNITED STATES PATENT OFFICE.

LEWIS W. HASSELMAN, OF INDIANAPOLIS, INDIANA.

STRAW-STACKER.

SPECIFICATION forming part of Reissued Letters Patent No. 10,347, dated July 3, 1883.

Original No. 274,940, dated April 3, 1883 Application for reissue filed April 21, 1883.

*To all whom it may concern:*

Be it known that I, LEWIS W. HASSELMAN, of Indianapolis, Indiana, have invented a new and useful Improvement in Straw-Stacking Machines, of which the following is a description, reference being made to the accompanying drawings, in the several figures of which like letters indicate like parts.

My invention belongs to that class of machines known as "straw-stackers," which are portable, and have a carrier composed of one or connected sections and mounted upon suitable frame-work, so that it may readily be elevated and revolved in any direction and folded up securely for transportation.

Heretofore stackers of this class have been usually sustained from a point above the carrier by means of a derrick, and the tilting of the carrier-frame has been accomplished by mechanism located above the carrier; and my object is to dispense with structures of this sort and to provide a stacker in which the actuating, revolving, and also the tilting mechanism operate from below the carrier-frame, and thus simplify the mechanism and operation of the machine and render it less bulky and expensive.

Figure 1:
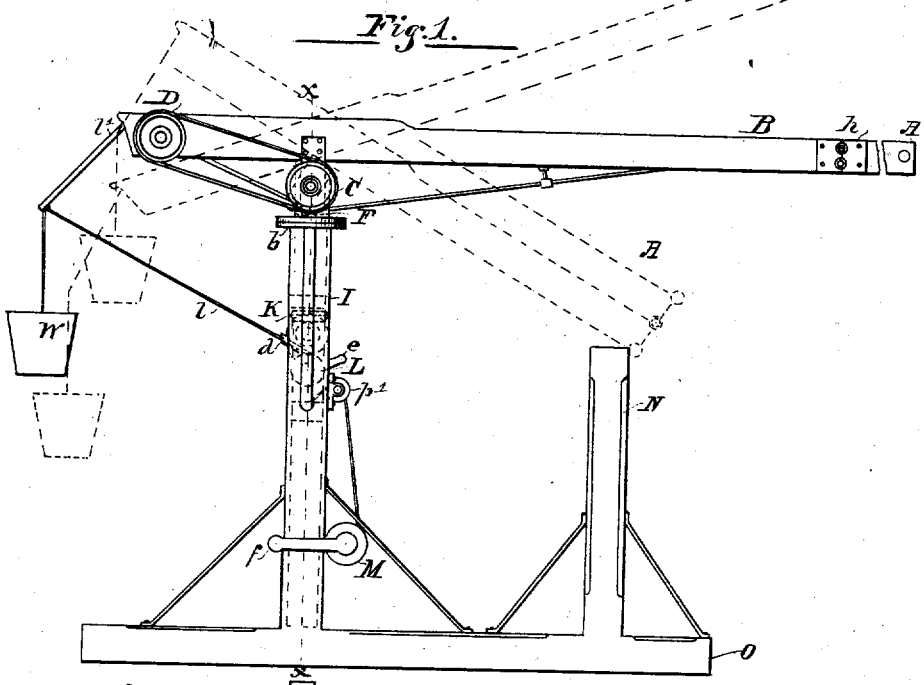
Figure 2:
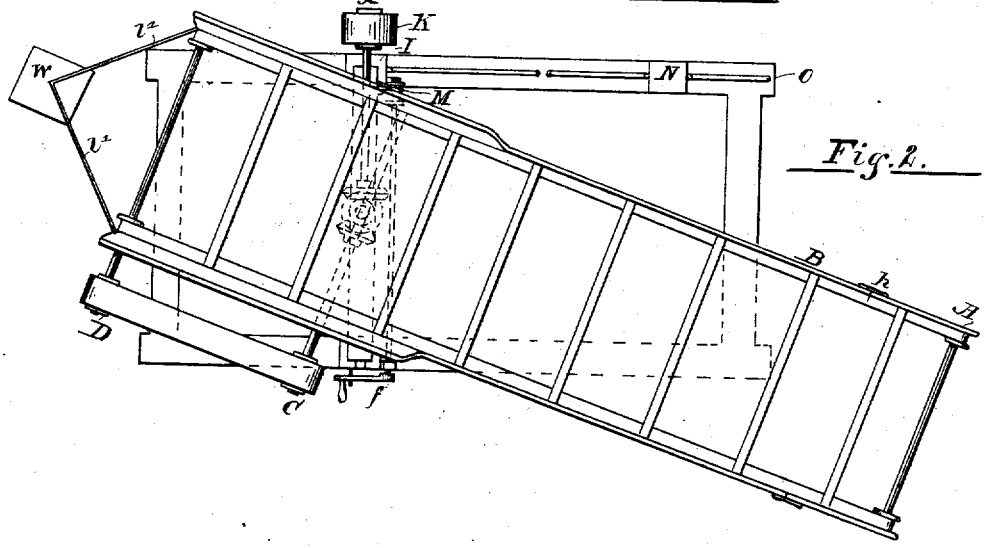
Figure 3:
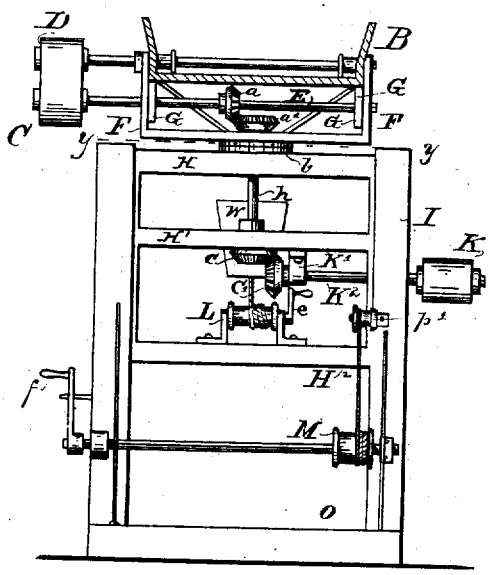
Figure 4:
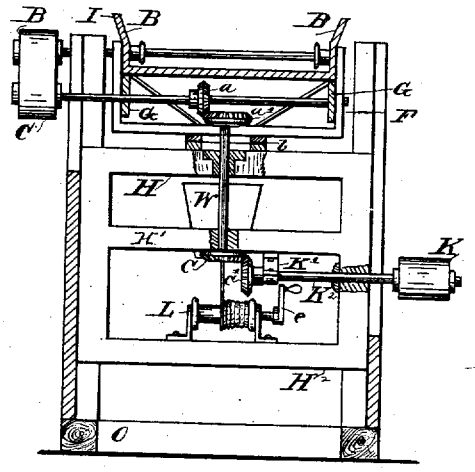
Figure 5:
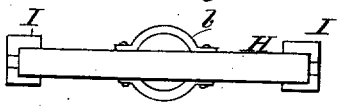
Figure 6:
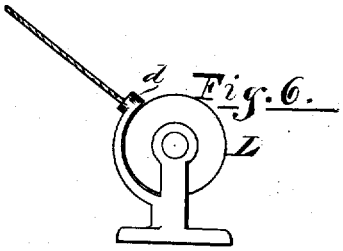
Figure 7:
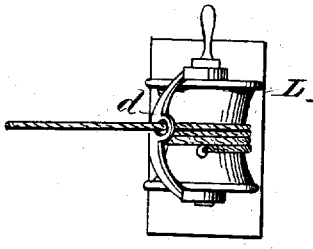

In the drawings, Figure 1 is a side view of my machine; Fig. 2, a top view; Fig. 3, a front view; Fig. 4, a vertical section on line *x x*, Fig. 1. Fig. 5 is a top view in the plane of line *y y*, Fig. 3, showing the fifth-wheel *b*. Fig. 6 is a side view, showing the pulley or windlass with the guide for the stay-rope. Fig. 7 is a top view of the same.

In detail, A is the outer or upper, and B the inner or lower, section of a straw-carrier, which are hinged at *h* for convenience in folding up. More than two sections may be used, if desired.

C and D are pulley-wheels, connected by a belt, and revolving in bearings in the revolving frame of the straw-carrier.

E is the shaft of the pulley-wheel C, having about midway a miter-wheel, *a*, which is geared into a second miter-wheel, *a'*, mounted on the vertical shaft *h*, which passes through the two upper cross-bars, H H', of the secondary frame. At the lower end of this vertical shaft is mounted a bevel-wheel, *c*, which engages with another bevel-wheel, *c'*, mounted on the shaft $K^2$, which is supported by the hanger K', and at its outer end is the driving-pulley K. It is readily seen that when power is applied to the driving-pulley K it is transmitted by the shaft $K^2$ and vertical shaft *h* to the horizontal shaft E, and thence by the belt on the pulley C to the wheel D, and thence to the endless slotted belt of the carrier, causing it to move around the rollers of the frame or chute B.

F F is a frame supporting the carrier, which revolves upon a fifth-wheel, *b*, so that it may be moved in either direction about its axis by hand or any suitable device.

G G are braces rigidly attached to the sides of section B of the carrier, and mounted on the shaft E in such manner as to allow the carrier to be tilted up and down, as indicated by the dotted lines in Fig. 1. This tilting is effected by means of the rope or chain *l*, which is attached at its upper end to a brace or stay, *l'*, fixed to the short end of the carrier, and the rope, passing through a guide, *d*, winds round a windlass, L, which is operated by a crank, *e*. When the carrier is in proper position, the crank may be secured by a hook or similar device.

W is a counter-balance for steadying the carrier, and it helps to relieve the strain on the windlass. It may be dispensed with, but may be used as indicated. A common box, to be filled with earth or stone when used, is sufficient.

N is a support for sustaining the stacker when folded up and let down for transportation. O is the sill of the main frame.

My machine may readily be used on the ground, or may be mounted on wheels; or it may be used in direct connection with a thrasher by dispensing with the sliding frame H H', and with a short straw-carrier on the thrasher when my machine is set close up to its end; or the straw might be allowed to fall from the thrasher directly upon the revolving carrier.

In Fig. 2 the dotted lines indicate the various positions of the shaft E as the carrier is revolved. It will be seen therefore that the carrier may be tilted up and down in a vertical plane, as shown by the dotted lines in Fig. 1, and at the same time revolved in a horizontal plane, as shown in Fig. 2, and that both these movements are effected by mechanism located below the plane of the carrier.

My machine operates as follows: If the machine be in the position shown in Fig. 1, by turning the crank *f* the operator lifts or raises the frame H H′, and with it the carrier, to the top of the stationary frame I, and the carrier may then be tilted up or down, or revolved on the fifth-wheel. When the work is done, the carrier is lowered by means of the same crank and its windlass, the sections are folded up, and the outer end let down to rest upon the support N by means of the crank *e* and its rope. It is then in position for transportation, the weight W, if used, being removed also.

It will be seen by this description and from the accompanying drawings that my carrier-frame is stayed and secured from below, tilted by mechanism located and operated from below, raised and lowered from below, and actuated from below; and I believe no other stacking-machine known or used before my application was originally filed was so constructed, actuated, or operated.

What I claim, and desire to secure by Letters Patent, is—

1. In a straw-stacker, the combination of the main frame I I, the vertical sliding frame H H′, adapted to move up and down therein, fifth-wheel *b*, and the frame F F, revolving on the fifth-wheel *b* and supporting the folding straw-carrier, with means for raising and lowering the sliding frame from below, substantially as described.

2. In a straw-stacker, the combination of a main supporting-frame, I I, a sliding frame, H H′, adjustable up and down in said frame, and a revolving folding stacker-frame supported wholly upon said sliding frame, substantially as described.

3. The combination, in a straw-stacker, of a main supporting-frame, I I, the secondary frame H H′, adapted to slide therein, the frame F F, supporting the straw-carrier A B, a main driving-shaft and pulley, a vertical shaft connected therewith by suitable gearing for revolving the carrier, the stay-rope *l*, and brace *l′*, and counter-balance W, substantially as and for the purpose described.

4. In a straw-stacker, the combination of the main frame I I, the secondary frame H H′, adjustable up and down in said main frame, a fifth-wheel located upon the secondary frame, the carrier, and mechanism for actuating the carrier, substantially as described.

5. In a straw-stacker, the combination of the main frame I I, the secondary frame H H′, adjustable up and down therein, the sectional carrier horizontally adjustable, and actuating gearing mounted below the plane of the carrier, substantially as described.

6. In a straw-stacker, the folding straw-carrier A B, the supporting-frame F F, the revolving plate *b*, and the straw-carrier braces G G, adapted to rotate upon the axis E when the carrier-frame is tilted, in combination with the axis E, the windlass L, and a rope connecting the windlass with the carrier, substantially as and for the purpose described.

7. The combination of the folding carrier A B, the frame F F, adjustable frame H H′, main frame I I, braces G G, shaft E, wheels *a a′*, pulleys D and C, and their connecting-belt, substantially as described.

8. In a straw-stacker, the folding and tilting carrier A B, adapted to revolve on the fifth-wheel *b*, in combination with such fifth-wheel, a supporting-frame, the stay-rope *l*, brace *l′*, windlass L, and its crank *e*, located and operated below the carrier-frame, substantially as described.

Witness my hand this 14th day of April, 1883.

LEWIS WM. HASSELMAN.

Witnesses:

C. P. JACOBS,

JACOB W. LOEPER.